US008678025B2

(12) United States Patent
Kitt

(10) Patent No.: US 8,678,025 B2
(45) Date of Patent: Mar. 25, 2014

(54) METHOD AND APPARATUS FOR CONTROLLING FLUID PRESSURE

(76) Inventor: Douglas Quinten Kitt, Salt Lake City, UT (US)

(*) Notice: Subject to any disclaimer, the term of this patent is extended or adjusted under 35 U.S.C. 154(b) by 1282 days.

(21) Appl. No.: 12/296,564

(22) PCT Filed: Apr. 21, 2008

(86) PCT No.: PCT/US2008/061063
§ 371 (c)(1),
(2), (4) Date: Oct. 9, 2008

(87) PCT Pub. No.: WO2009/029295
PCT Pub. Date: Mar. 5, 2009

(65) Prior Publication Data
US 2010/0229954 A1    Sep. 16, 2010

Related U.S. Application Data

(60) Provisional application No. 60/967,075, filed on Aug. 30, 2007.

(51) Int. Cl.
*G05D 7/00*     (2006.01)
*G05D 9/00*     (2006.01)
*F16K 31/12*    (2006.01)
*F16K 31/36*    (2006.01)

(52) U.S. Cl.
USPC .......................................... 137/102; 137/486

(58) Field of Classification Search
USPC .......... 137/102, 488, 115.13, 118.01, 118.04, 137/118.06, 115.03, 486
See application file for complete search history.

(56) References Cited

U.S. PATENT DOCUMENTS

| 1,981,576 | A | * | 11/1934 | Woolfenden | 137/484.2 |
| 2,410,876 | A | * | 11/1946 | Griswold | 137/110 |
| 2,991,796 | A | * | 7/1961 | Griswold | 137/489 |
| 3,604,451 | A |   | 9/1971 | Delamater |  |
| 3,669,143 | A | * | 6/1972 | Reese | 137/512.3 |
| 4,630,639 | A | * | 12/1986 | Akita et al. | 137/486 |
| 4,917,144 | A | * | 4/1990 | Giles | 137/488 |
| 5,555,910 | A | * | 9/1996 | Powell et al. | 137/488 |
| 5,967,176 | A | * | 10/1999 | Blann et al. | 137/489.5 |
| 6,164,319 | A | * | 12/2000 | Cochran et al. | 137/487.5 |
| 6,418,956 | B1 | * | 7/2002 | Bloom | 137/14 |

FOREIGN PATENT DOCUMENTS

JP    2006-329416 A    12/2006

* cited by examiner

*Primary Examiner* — Len Tran
*Assistant Examiner* — Chee-Chong Lee

(57) ABSTRACT

A method and apparatus to control pressure in a fluid delivery system utilizes a variable-pressure regulating means and a flow-controlled selecting means to provide a higher pressure when the flow in the system is higher, and to provide a lower pressure when the flow in the system is lower. It exploits an inherent signal that is generated and transmitted by the fluid, and which enables remote control of the pressure. Useful, for example, to provide pressure control for a garden hose fitted with a closeable nozzle, wherein full pressure is provided through the hose when the nozzle is open, lower pressure is maintained when the nozzle is closed, and the operator controls pressure in the hose from the fluid delivery end of the hose, protecting the hose from bulging or splitting, making the hose easier to handle, and conserving water. Other applications include protecting washing machine supply hoses from bursting and flooding; and pressure control of fire sprinkler, compressed gas, and pneumatic control systems.

14 Claims, 3 Drawing Sheets

METHOD AND APPARATUS FOR CONTROLLING FLUID PRESSURE

TECHNICAL FIELD

The present invention is in the field of methods and devices for controlling fluid pressure.

BACKGROUND ART

A closeable spray nozzle attached to the downstream end of a garden hose is a useful tool. One particularly desirable reason to use such a nozzle is to stop the water flow from the hose without having to shut off the hose supply valve that is commonly some distance away from the downstream end of the hose. However, closing the spray nozzle causes high water pressure to build up in the hose, and thus creates several problems:

- The hose can be damaged by the high pressure. Particularly if it is left exposed to the hot sun while charged with high water pressure, a hose will often swell, bulge and/or split.
- High pressure in a hose causes water leaks at joints, fittings, and repaired places. Since hose fittings are subjected to damage from being dropped, stepped on, or otherwise abused in normal use, it is very common that the junction between two hoses, or the joint where a hose end fitting connects to a nozzle, is not perfectly sealed and therefore leaks water. Hose repair devices, including replacement hose end fittings and couplings for splicing two segments of hose together, are notorious for leaking. Under high pressure these leaks result in a significant amount of wasted water, and are very annoying because they spray water on people and things nearby.
- A hose which is charged with high pressure becomes very rigid and tends to straighten, so it is difficult to handle and move about. Handling a charged hose can be likened to wrestling with a snake!

Washing machines are among the most common appliances in the world, and are almost universally connected to water supplies by hoses. Hose failures are a common cause of floods that result in costly damage to homes. Most often, a hose failure is the result of containing continuous high pressure in the hose, and as the hose ages, becomes brittle, swollen or otherwise weakened it ultimately fails by splitting or separating from a hose end fitting. It is particularly catastrophic if this occurs when the homeowner is away or otherwise unaware of the problem. Interestingly, the only time that full house pressure is needed in a washing machine hose is during those few minutes in each cycle when the machine is filling; it can reasonably be asserted that 99% of the time, a typical washing machine hose is standing unnecessarily charged with high pressure that is subjecting it to stress, damage, and likelihood of failure. Many appliance manufacturers recommend that water supply valves upstream of the hoses be shut off whenever a washing machine is not in use. However, this recommendation does not appear to be regularly practiced by users; one insurance company claims that "washing machine hose failures cause about $150 million in damage to homes in the United States and Canada each year."

Other fluid delivery systems can suffer from similar problems. In any system containing fluid under pressure, hoses, tubing and other components are stressed by high pressure, and leaks, if present, are exacerbated. It is desirable to provide a lower pressure to those components when the maximum delivery pressure is not needed. The invention disclosed here solves or mitigates these problems by providing high pressure when it is needed, by supplying lower pressure when high pressure is not needed, automatically, and in a completely novel way. Furthermore, it will be seen that the invention takes advantage of an inherent signal within a fluid system that enables selection of the desired pressure from a position a great distance downstream of the point where pressure is controlled, without the need for any extraneous mechanical, electrical, radio wave, or other signal that is not inherent in the fluid system.

Prior art includes water pressure regulators, well-known in the art, which can reduce the fluid pressure downstream of the regulator. Many homes and other buildings are equipped with a water pressure regulator to reduce the "street pressure" to a lower pressure ("house pressure") in the water supply throughout the building. Typically however, the house pressure that is needed or desirable to supply the plumbing fixtures in a building (sinks, bathtubs, etc) is still much too high to contain in a garden hose without experiencing the problems described above. An additional, conventional water pressure regulator on the supply to a garden hose may be used to reduce the pressure in the hose even further. Pressure regulators designed specifically for attaching to a hose bib fitting to further reduce house pressure are available and well-known in the art. When such a regulator is used, and the flow of water is stopped or restricted at the delivery end of the hose, the pressure in the hose can build only to the pressure set-point of the regulator. This protects the hose and reduces the flow of water through any leak-points. But it is desirable to have house pressure available in a garden hose and at the nozzle when using the system to spray forcefully (such as when hosing off the driveway) or to deliver a lot of water (such as when watering lawns). Thus using an additional regulator to constantly reduce the water pressure supplied to a garden hose, to a pressure low enough to mitigate the above-described problems, is not desirable because this amount of pressure is insufficient for many common purposes. A conventional pressure regulator could be used to protect a washing machine hose, but again would not allow full house pressure when the washing machine was filling, resulting in an unacceptably slow filling rate.

Prior art also includes a fluid flow control apparatus for controlling and delivering fluid at a continuously variable flow rate to a hose, as described by Filonczuk in U.S. Pat. No. 6,561,481 which is incorporated here by reference. By means of an electrically operated valve located in a valve unit at the hose bib end of a hose, and controlled by a variable electrical switch located at the fluid outflow end of the hose, this device can solve some of the problems previously described. However, the Filonczuk device suffers from numerous problems and undesirable features. It requires an electrical energy source, in this case a battery. It requires electrical wire connecting between the switch and the valve apparatus to carry a control signal, the wire being contained inside the hose and exposed to water, and also subject to being twisted and bent along with the hose. Since the wire is permanently attached at both ends of the hose, the hose portion must be a part of the entire assembly. Therefore the length of the hose is fixed, and the hose portion, if damaged, cannot be easily removed or replaced. The length of the hose cannot be extended by coupling an additional length of common garden hose, because the control switch cannot be moved to the end of the additional hose. Also, water can drain from the hose when the valve is closed, and therefore the operator must wait while the hose refills upon reopening the valve by activating the nozzle switch. In the case of a garden hose pressure control, what is needed is a method and device to control the water pressure in a hose, such that pressure is controllable from the outflow end of the hose, that does not require an electrical or other non-inherent type of controlling signal between the outflow end of the hose and the hose bib end of the hose, and that can control the hose pressure such that high pressure is supplied when there is a demand for water (when the spray nozzle is open), but low pressure is maintained when there is not a demand for water (when the spray nozzle is closed).

Prior art also includes the method and apparatus of Green for monitoring fluid flow through a pipe described in U.S. Pat. No. 6,940,409 which is incorporated here by reference. An acoustic generator that is activated by fluid flow can be located far from an acoustic receiver within the fluid system, the receiver being capable of detecting the acoustic signal transmitted through the fluid in the system. By utilizing the fluid as a signal transmission means, Green is able to transmit a signal without the need for electrical wires or other extraneous signal carrying means. The pertinence of Green's invention to the present invention is only that it demonstrates the remarkable features and benefits gained by taking advantage of a property that is inherent in the system. In Green's case, however, an extraneous signal generator is needed. The present invention exploits an inherent signal in a fluid delivery system where both the generation and the transmission of the signal are inherent.

DISCLOSURE OF THE INVENTION

The present invention is a method and apparatus to control the pressure in a fluid delivery system, wherein higher pressure is allowed when there is a demand for fluid delivery from the downstream side, and lower pressure is maintained when there is no demand or a substantially reduced demand for fluid delivery from the downstream side. These functions are provided by combination of a "variable-pressure regulating means" (VPRM) with a "flow-controlled selecting means" (FCSM). The VPRM must be capable of controlling the downstream pressure at, at least, two different pressures, a higher pressure and a lower pressure, and the pressure at which the VPRM regulates must be selectable. The lower pressure supplied by the VPRM must be sufficiently different from the pressure outside the system that a detectable flow within the system is created when there is a demand for fluid delivery. Said demand is indicated by the flow rate of fluid in the system, wherein a higher flow rate indicates a demand for fluid delivery, whereas no flow, or a substantially reduced flow rate, indicates no or reduced demand for fluid delivery. The FCSM must be capable of detecting flow in the system and providing a signal to select at which of the selectable pressures the VPRM regulates.

Some terms are defined here for correct interpretation of those terms in this specification and the accompanying claims:

"Ambient pressure" is the pressure that fluid released from within a fluid delivery system is or would be subjected. For example, water released from a garden hose would be subjected to atmospheric pressure. Since the present invention could be applied in a system which, for example, released fluid into a sub-system which was itself at a greater pressure than its surroundings, ambient pressure would in that case be the pressure within the sub-system. The term "ambient" should not be construed as limited to referring only to the external environment.

"Automatic" means having a self-acting or self-regulating mechanism. Automatically adjusting pressure within a fluid delivery system means that an operator need not perform any other act than to release or stop the release of fluid from the system, in order to also adjust the pressure in the system to the desired pressure setting.

"Fluid" is a substance that continually deforms (flows) under an applied shear stress. All liquids and all gases are fluids. Some solids, such as plastic solids, or a plurality of finely divided solid particles, are also fluids.

"Fluid delivery system" is a system which can contain fluid at a pressure greater than ambient pressure, and from within which fluid can escape. The present invention could be applied in a system that had a primary purpose other than "delivery" of fluid, for example a pneumatic control system might allow only small amounts of fluid to escape periodically and be primarily intended for actuating another device rather than for delivering the fluid contained in it.

"Operator" when used to describe the entity utilizing a fluid delivery system can mean a human being, such as when a person operates a spray nozzle attached to a garden hose. However, the present invention could be applied in a system wherein the act of releasing fluid, or the act of stopping the release of fluid, from the fluid delivery system is accomplished by a solenoid valve or some other non-person entity.

"Upstream" refers to the direction from which fluid normally flows within a fluid delivery system, and "downstream" refers to the direction to which fluid normally flows. The terms "upstream" and "downstream" may refer to a point or region in a fluid delivery system in relation to some other point or region in the system. The terms "upstream" and "downstream" may also refer to regions of a fluid delivery system that are differentiated by a demarking characteristic. For example, if a region of a fluid delivery system is at a high pressure state, and another region of that fluid delivery system is at a lower pressure state, then a "downstream" region might include all of the portion of the fluid system that is at lower pressure, demarked by that point in the system where the downstream region is adjacent to a region of high pressure.

MODES FOR CARRYING OUT THE INVENTION

Figure 1:
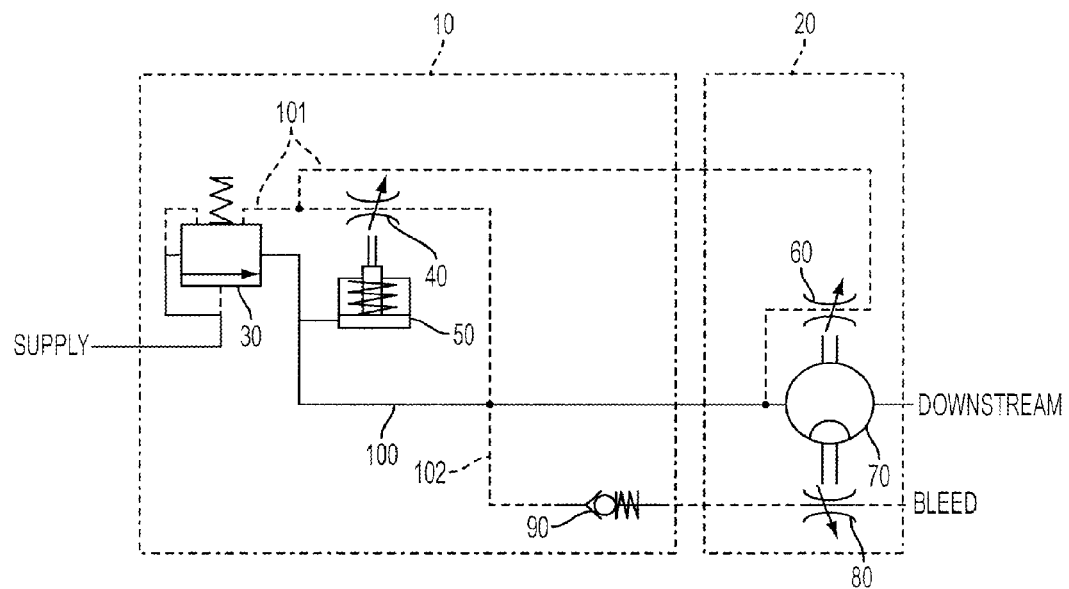
FIG. 1 is a schematic diagram of one embodiment of the invention. This embodiment operates entirely by "fluid power," meaning the method and apparatus operate utilizing the energy available in the pressurized fluid supply. No external electrical or other power supply is needed.

Referring to FIG. 1, fluid under pressure provided by an upstream fluid supply is indicated by the word SUPPLY. Supply fluid enters pilot-operated valve 30 and can flow into main passage 100 when valve 30 is open. Pilot passage 101 is in fluid communication with the pilot port of valve 30 such that valve 30 is closed whenever pilot valve 40 and pilot valve 60 are both closed. Pilot valve 40 is actuated by actuator 50, such that when the pressure in main passage 100 is less than the pressure set-point of actuator 50, actuator 50 will open pilot valve 40, which in turn opens valve 30 to allow fluid flow and pressure into main passage 100. When pressure in main passage 100 exceeds the pressure set-point of actuator 50, actuator 50 will close pilot valve 40, in turn closing valve 30. The pressure set-point of actuator 50 is a low pressure set-point, thus pilot valve 40 serves to control valve 30 to maintain a low pressure in main passage 100. Pilot valve 60 is actuated by flow detector 70 such that when flow is detected, pilot valve 60 is opened, which in turn opens valve 30 and allows full supply pressure (high pressure) in main passage 100. Conversely, when no flow is detected, pilot valve 60 is closed, in turn closing valve 30. Bleed passage 102 is in fluid communication with main passage 100, and can deliver fluid through back-pressure valve 90, and then through bleed valve 80. Bleed valve 80 is actuated by flow detector 70 to close bleed valve 80 when flow is detected. Fluid from DOWNSTREAM can pass through flow detector 70 in the reverse direction (from DOWNSTREAM towards SUPPLY), and flow in the reverse direction is not detected, or is not interpreted to be flow, by flow detector 70. In a preferred embodiment, actuation of pilot valve 60 and bleed valve 80 by flow detector 70 are in sequence, i.e. when flow is detected, bleed valve 80 is closed before pilot valve 60 is opened; when flow is stopped, pilot valve 60 closes before bleed valve 80 opens. VPRM 10 indicates those components that represent the variable-pressure regulating means in this embodiment, and FCSM 20 indicates those components that represent the flow-controlled selecting means.

The operation of the embodiment of FIG. 1 is best described by the state of the fluid pressure in various passages and the functional state of various components, when compared to the state of demand for fluid flow from downstream. For illustration, examples of pressure set-points that might be utilized in the embodiment when applied to a typical household garden hose water delivery system are given. In the following functional descriptions of FIG. 1, assume that there is a higher fluid pressure available from the SUPPLY of 60 psi, which is a typical "house pressure" of a household water supply system. A desirable water pressure to contain in a garden hose when there is no water flow might be in the range of 10-15 psi, therefore assume that the set-point of actuator 50 is 10 psi, and the set-point of back-pressure valve 90 is 15 psi.

When there is no demand for fluid from DOWNSTREAM (e.g., when the nozzle at the end of a garden hose is closed) there is no flow in the system, and flow detector 70 is in a no-flow state. In this state, pilot valve 60 is closed and bleed valve 80 is open. Since pilot valve 60 is closed, pilot passage 101 is blocked and SUPPLY pressure is contained in pilot passage 101 to close valve 30. Since bleed valve 80 is open, fluid in main passage 100 can escape through back-pressure valve 90 if the fluid pressure in main passage 100 is greater than the set-point of back-pressure valve 90, which in this example is 15 psi. Therefore, the fluid pressure in main passage 100 is 15 psi. Since the fluid pressure in main passage 100 is 15 psi, it is greater than the pressure set-point of actuator 50 (10 psi). Therefore actuator 50 holds pilot valve 40 closed, and valve 30 is closed. Since DOWNSTREAM fluid can pass in the reverse direction through flow detector 70 into main passage 100, the pressure DOWNSTREAM is equalized to the pressure in main passage 100 at 15 psi. Therefore, in the garden hose application example, the pressure contained in the garden hose when its nozzle is closed is a lower pressure of 15 psi.

Transitional events occur when the embodiment of FIG. 1 is in the above-described functional state and then there is demand for fluid from DOWNSTREAM (e.g., when the nozzle at the end of a garden hose is opened). Flow is created in the system due to the pressure differential between main passage 100 which contains fluid at a low pressure (15 psi) and the DOWNSTREAM end which is now open to ambient pressure. As fluid begins to flow from main passage 100 to DOWNSTREAM, the pressure in main passage 100 drops until it reaches the set-point pressure of actuator 50 (10 psi), whereupon actuator 50 opens pilot valve 40, in turn opening valve 30. Thus pressurized fluid is admitted into main passage 100, replenishing the fluid that is flowing DOWNSTREAM, maintaining a low pressure in main passage 100, and therefore maintaining flow through flow detector 70. Flow detector 70 closes bleed valve 80 and opens pilot valve 60, thereby blocking flow through bleed passage 102 and allowing flow through pilot passage 101. The resulting pressure drop in pilot passage 101 allows valve 30 to open, therefore full SUPPLY pressure (high pressure) and flow is allowed into main passage 100. Thus high pressure fluid can flow through flow detector 70 and is available DOWNSTREAM. Therefore, in the garden hose application example, the pressure available in the garden hose is higher pressure (up to 60 psi) so long as flow is maintained (e.g., the hose nozzle is kept open).

Transitional events occur when the embodiment of FIG. 1 is in the above-described "flowing" functional state and then the demand for fluid from DOWNSTREAM is stopped (e.g., when the nozzle at the end of a garden hose is closed). The pressure in main passage 100 is equalized with the pressure DOWNSTREAM to the higher pressure (60 psi). Fluid flow through flow detector 70 ceases, so pilot valve 60 is closed and bleed valve 80 is opened. Since the pressure in main passage 100 is above the set-point of actuator 50, pilot valve 40 is also closed. Since pilot valves 40 and 60 are both closed, valve 30 is closed, preventing SUPPLY fluid from entering main passage 100. Since bleed valve 80 is open, fluid from main passage 100 can escape through bleed passage 102 until the pressure in main passage 100 and DOWNSTREAM drops to the lower pressure of 15 psi, which is the set-point of back-pressure valve 90. At this point, the "no-flow" functional state has again been achieved, and again the DOWNSTREAM pressure is controlled at 15 psi.

When the function of the embodiment of FIG. 1 is understood, then a remarkable feature of the present invention can be appreciated. The flow of fluid in the fluid delivery system is controlled by the containment or release of fluid at the DOWNSTREAM end, but that flow is a signal that can be detected upstream of the DOWNSTREAM components. The present invention utilizes that signal, which is inherent in the fluid delivery system, to control the pressure in the DOWNSTREAM components at more than one pressure setting. For example, when the present invention is applied to a household garden hose fluid delivery system, the operator of a spray nozzle at the delivery end of a garden hose controls the fluid flow by opening and closing the spray nozzle. Surprisingly, the operator can now also control the pressure in the hose, such that the pressure is higher when higher pressure is desirable and lower when lower pressure is desirable, without any additional action, and without needing any additional apparatus at the DOWNSTREAM end. The operator can be a great distance from the supply valve, and does not need to go to the supply valve to achieve the desirable result.

It should be understood that the terms "no demand for fluid" and "no flow" in the above and following descriptions can be replaced with the terms "reduced demand for fluid" and "reduced flow," respectively. The FCSM can be calibrated such that a small amount of flow is allowed without actuating, and this gives rise to other remarkable and unanticipated features, which can be described and appreciated using the example application in a garden hose fluid delivery system. Since garden hose connections and fittings commonly leak, a constant low flow of fluid could exist in the system which could prevent the VPRM from being selected to produce a low pressure state if the FCSM is calibrated to actuate at a flow rate less than the rate produced by leaking. It might be desirable to calibrate the FCSM such that a small amount of flow is tolerated in the fluid delivery system to accommodate such leaks. Thus the present invention can reduce the volume of water loss and reduce the intensity of annoying sprays from such leaks by lowering the pressure in the hose even when some leakage is present. Furthermore, if the FCSM is calibrated to tolerate a small amount of flow, then the operator of the hose spray nozzle can release a small flow of water from the spray nozzle by carefully opening the nozzle a small amount while the VPRM remains in the low pressure state. This enables the operator to utilize a small flow of water from a spray nozzle at low pressure, which may be desirable for gentle watering of seedlings, for example, or to obtain a drink of water from the spray nozzle.

Figure 2:
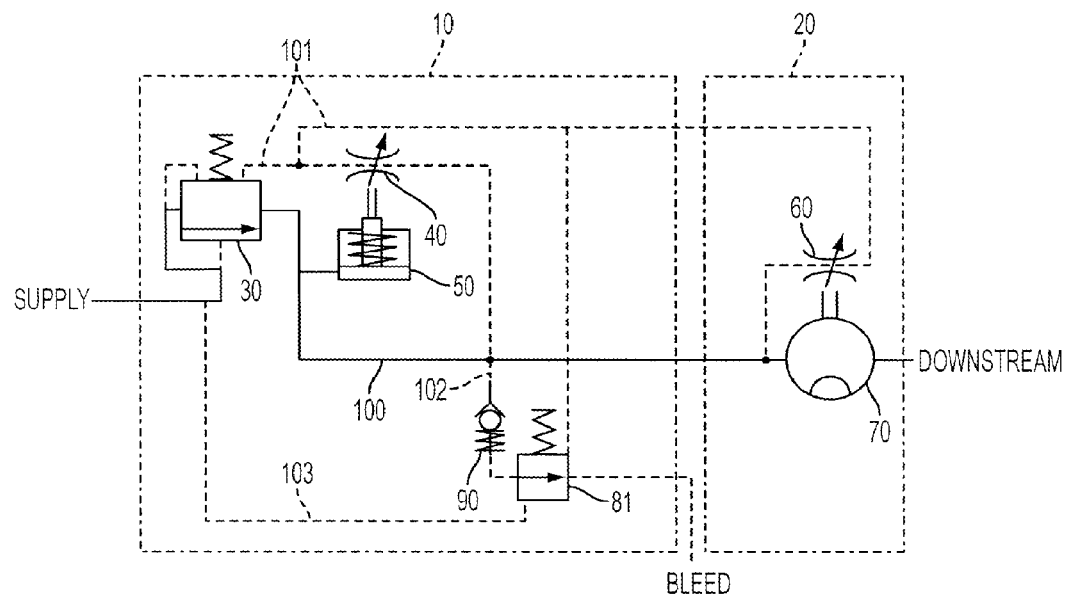
FIG. 2 is a schematic diagram of another embodiment of the invention, showing alternative fluid power components.

FIG. 2 is similar to FIG. 1 but utilizes a different bleed mechanism. The mechanically-activated bleed valve 80 seen in FIG. 1 is replaced in the embodiment of FIG. 2 with fluid power-activated bleed valve 81. Pilot passage 101 is in fluid communication with a pilot port of bleed valve 81. When pilot valve 60 is closed, full supply pressure is present in pilot passage 101, causing bleed valve 81 to open and therefore fluid from main passage 100 can escape through bleed passage 102 until the pressure in main passage 100 and DOWNSTREAM drops to the pressure set-point of back-pressure valve 90. Pilot passage 103 is in fluid communication between SUPPLY and a pilot passage of bleed valve 81 such that the actuating pressure of bleed valve 81 can be automatically balanced to accommodate different absolute SUPPLY pressures.

Figure 3:
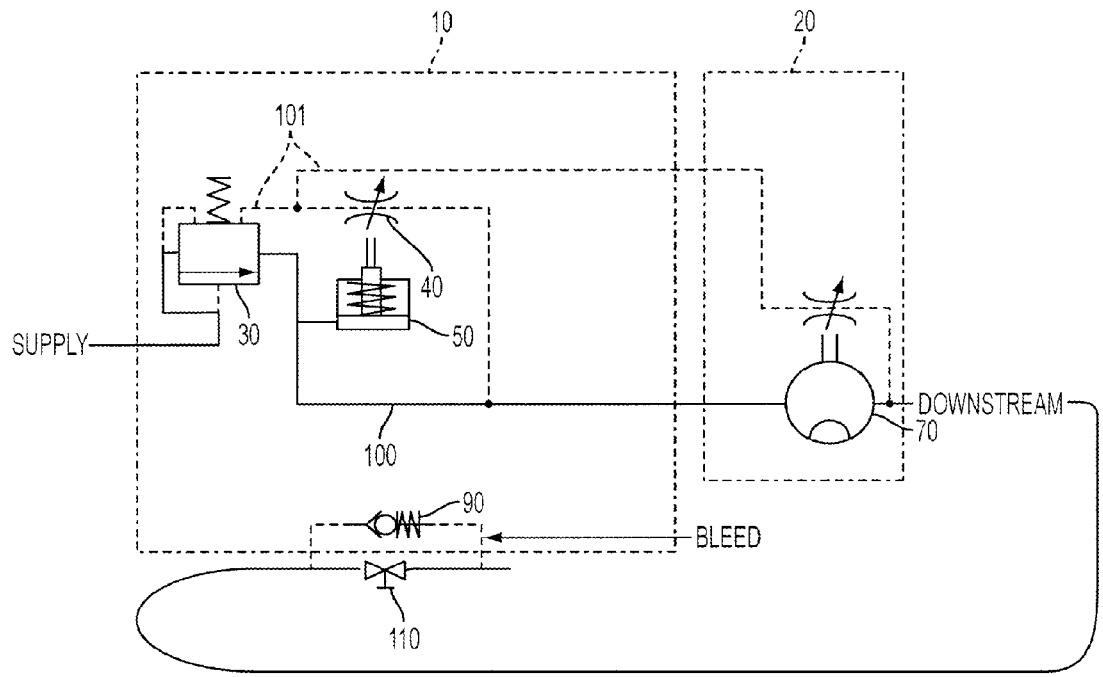
FIG. 3 is a schematic diagram of another embodiment of the invention, demonstrating an alternative fluid power pathway, and a remotely located component of the VPRM.

FIG. 3 shows still another embodiment with a different bleed mechanism, specifically one where back-pressure valve 90 is located at the end of the downstream components that are protected. In a garden hose application, back-pressure valve 90 could be incorporated into the handle of a spray nozzle that also includes nozzle valve 110. This is a desirable arrangement in a garden hose application, since bleed water can escape through the spray nozzle, where water normally flows, to a location which is already wet or is expected to get wet. The bleed mechanism of the embodiment shown in FIG. 3 might further be controlled by a delay mechanism or a pressure sensitive switch mechanism to allow fluid to bleed through the mechanism only after a delay period or only after reaching a certain pressure threshold.

In one embodiment that is within the scope of the present invention, no specific components to provide a bleed need be incorporated. Since many garden hose water delivery systems leak, at least a little, water might be expected to "bleed" from the system. Or, the operator of the spray nozzle on a garden hose application could manually bleed the system by carefully opening the nozzle. In either case, an embodiment that does not include a bleed mechanism may still be very acceptable and useful to the operator, and still incorporates the basic VPRM+FCSM concept.

In one embodiment, an accumulator mechanism is provided to contain the fluid passing through the bleed circuit in the "no-flow" state, and then deliver the fluid back into the main stream during the "flow" state. This provides an "internal bleed" which is desirable when the present invention is used in a location where escaping bleed fluid is problematic.

Figure 4:
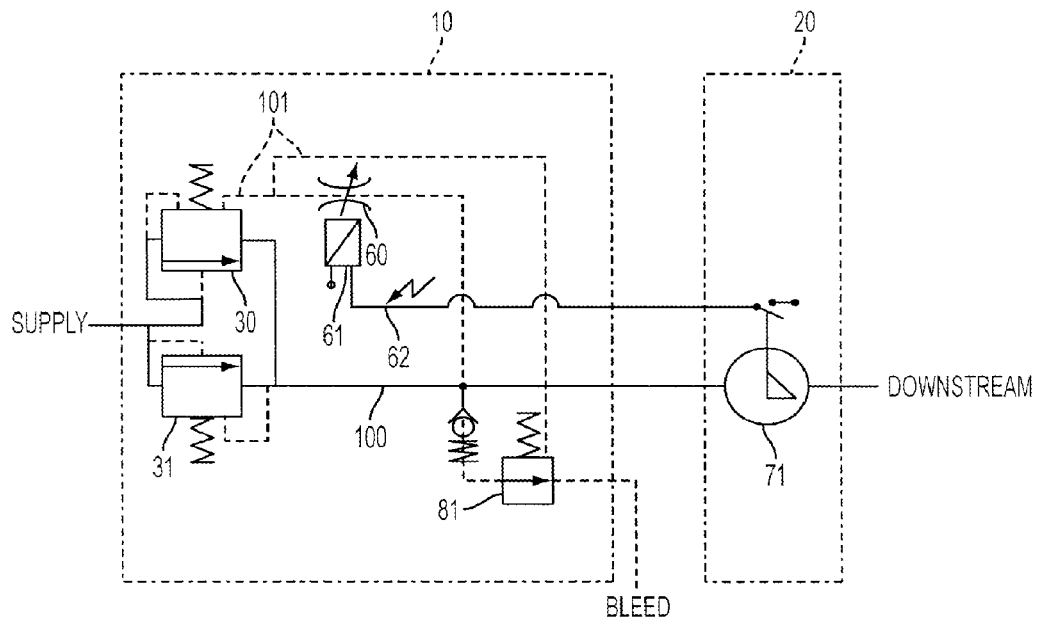
FIG. 4 is a schematic diagram of another embodiment of the invention, showing alternative fluid power components as well as electrically-operated components.

FIG. 4 demonstrates that alternate configurations of components can be assembled to accomplish the functions of either the VPRM 10 or the FCSM 20. In regard to FCSM 20, an electrically-operated flow detector 71 is depicted. An electrical signal pathway 62 is used to activate solenoid 61, which in turn is used to operate valve 60 which functions as described in FIG. 1. This has the advantage of using readily available electrically-operated components, including various flow sensors and solenoid-operated valves well known in the art, but has the disadvantage of requiring an external source of power. Thus it may not be considered a preferred embodiment, but it nevertheless enables the remarkable feature of utilizing the inherent flow single in the fluid delivery system. Therefore, in a garden hose application example, the electrically-operated components can be located near the SUPPLY which is close to the house where a source of electrical power is conveniently available. No power source, electrical wires, or switch is needed near the operator-activated spray nozzle, because no additional mechanism or action is needed to transmit a signal to the components located near the house. Embodiments utilizing components that require an external source of power are within the scope of the present invention, and the external power source could include electrical power, pneumatic power, hydraulic power, or other power types.

FIG. 4 also illustrates an alternate means to provide two selectable pressure settings within the VPRM. Specifically pressure regulator valve 31 is in parallel with pilot-operated valve 30 such that SUPPLY fluid can enter main passage 100 through either of these valves. Pressure regulator valve 31 is calibrated to provide a lower pressure which is available to main passage 100 at all times, and valve 30 can provide full SUPPLY pressure (higher pressure) whenever pilot valve 60 is open, therefore a lower pressure or a higher pressure is selectively provided in main passage 100.

Figure 5:
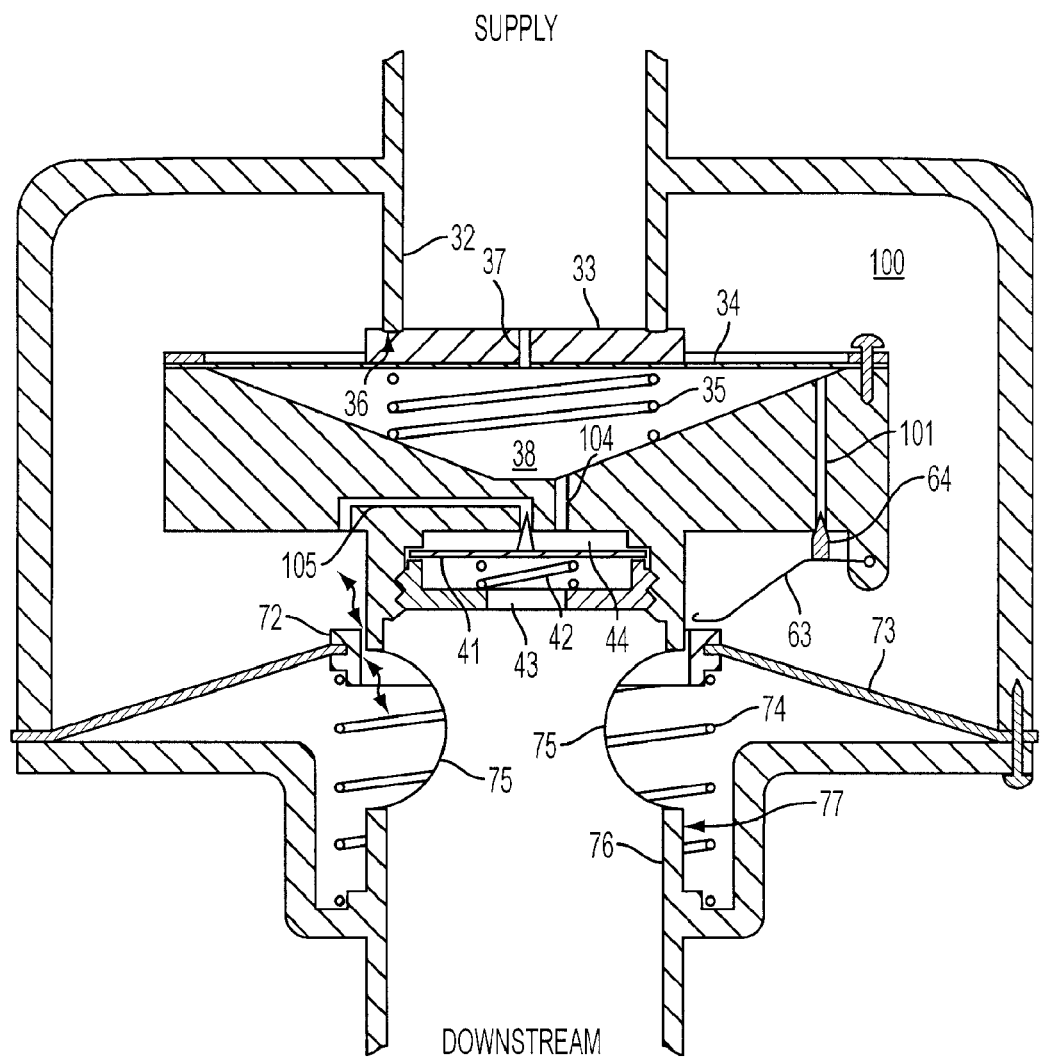
FIG. 5 is a cross-section mechanical diagram of another embodiment of the invention.

FIG. 5 is a cross-section mechanical diagram of another embodiment. SUPPLY fluid enters through cylindrical supply port 32. The downstream edge of supply port 32 forms circular valve seat surface 36. When valve face 33 is urged against valve seat surface 36, fluid from SUPPLY is blocked from entering main passage 100. Metered passage 37 allows SUPPLY fluid to enter valve chamber 38, and when fluid cannot escape from chamber 38 through pilot passages 101 or 104, full SUPPLY pressure builds up in chamber 38, and urges against valve diaphragm 34 from within chamber 38. This force is supplemented by compressive force from valve spring 35 to urge valve face 33 against valve seat 36. When fluid can escape from chamber 38 through pilot passages 101 or 104, less fluid pressure is exerted against diaphragm 34 from within chamber 38. Then SUPPLY pressure from within port 32 urges valve face 33 away from valve seat 36 to allow SUPPLY fluid to enter main passage 100.

Pilot passage 104 allows fluid from chamber 38 to enter valve chamber 44, and diaphragm/needle valve assembly 41 blocks pilot passage 105 by urging of DOWNSTREAM pressure through hole 43 against diaphragm/needle valve assembly 41 supplemented by compressive force from spring 42. The compressive force of spring 42 is calibrated to close passage 105 when at least a pre-selected "lower pressure" exists in DOWNSTREAM fluid, and to open passage 105 when the DOWNSTREAM pressure is less than the pre-selected "lower pressure." When pilot passage 105 is opened, fluid can pass from chamber 38 through passage 104, and therefore SUPPLY fluid can pass into main passage 100. A limited flow of fluid from main passage 100 can pass between the medial surface of actuator ring 72 and the downstream port lateral surface 77 as indicated by double-headed flow arrows in FIG. 5. This fluid can then pass through downstream port cutouts 75 into downstream port 76. Thus fluid pressure in main passage 100 is maintained, at least, at a "lower pressure," and within the limitations of the small flow indicated by the double-headed arrows, DOWNSTREAM pressure can also be maintained at the "lower pressure."

Pilot passage 101 is opened or closed by needle valve 64 which is connected to and moved by valve arm 63. Valve arm 63 is pressed by actuator ring 72 under compressive force of actuator spring 74 to hold needle valve 64 in the closed position. However, when there is a demand for fluid DOWNSTREAM, then a pressure differential is created between main passage 100 and DOWNSTREAM. Pressure in main passage 100 urges against actuator diaphragm 73 to move actuator ring 72 in the downstream direction. Thus needle valve 64 is no longer held in the closed position by valve arm 63, fluid flows from chamber 38 through pilot passage 101, and SUPPLY fluid enters main passage 100 in large volume at SUPPLY pressure ("higher pressure"). Since actuator ring 72 has moved in the downstream direction, main passage 100 is exposed to downstream port cutouts 75, thus a large volume of flow at higher pressure can pass DOWNSTREAM. This flow state is maintained so long as there is demand for fluid from DOWNSTREAM.

When demand for fluid from DOWNSTREAM ceases, then fluid pressure equalizes in downstream port 76, main passage 100 and SUPPLY at full SUPPLY pressure. Since there is no longer a pressure differential between main passage 100 and downstream port 76, actuator spring 74 urges actuator ring 72 in the upstream direction. A small amount of fluid can pass from main passage 100 into downstream port 76 as indicated by the double-headed arrows, therefore actuator ring 72 can move fully to the position where it presses valve arm 63 to hold needle valve 64 in the closed position.

At this point, if fluid is carefully released or "bled" from DOWNSTREAM at a rate not exceeding the flow capacity indicated by the double-headed arrows, then actuator 72 will continue to press on valve arm 63, and the pressure in main passage 100 and DOWNSTREAM will slowly drop to, and then be maintained at, the previously described lower pressure. No bleed mechanism is shown in FIG. 5, but it should be appreciated that a bleed mechanism can be located far DOWNSTREAM as demonstrated in FIG. 4, or that the embodiment of FIG. 5 can be utilized without any specific components to provide a bleed as previously discussed.

In the descriptions and drawings of various embodiments, a VPRM capable only of regulating pressure at two different pressures is generally shown. However, it is recognized that the VPRM could be capable of regulating the downstream pressure at multiple, discreet, intermediate set-points, or at a pressure that is infinitely variable within a range between the maximum and minimum regulated pressure. These variations are within the scope of the present invention. The upper limit of the range of higher pressures that can be provided is the same as the SUPPLY pressure, and the lower limit of the higher pressure range is a pressure greater than the lower pressure. The upper limit of the lower pressure range is a pressure less than the higher pressure, and the lower limit of the lower pressure range is a pressure greater than ambient.

In the descriptions, and drawings of various embodiments, examples of typical fluid pressures in a garden hose water delivery system are given. These examples should not be construed as limiting in any way the absolute maximum or minimum pressures at which the present invention may be embodied to operate, since applications of the invention to other types of fluid delivery systems could very conceivably involve much lower or higher pressures than the examples.

Schematic symbols are utilized in the Figures, many of which are standard ISO symbols used to depict various known components. These symbols illustrate the function of the component as described in this description, and should not be construed to limit the operating mechanism to any specific type of component; nor should these symbols be construed to limit the size, volume, operating pressure, or other quantitative characteristic of any component beyond the function as described. Many components can be depicted by multiple schematic symbols that are functionally equivalent.

Fluid flow is detected by various means well-known in the art, and generally relies upon the detection of either the conditions that create flow or upon the detection of phenomena that are the result of flow. Flow is created by a pressure differential, so detecting that pressure differential is a means to detect flow. Phenomena such as heat absorption of a flowing fluid, disturbances such as vortices created in the fluid by flow, the Venturi Effect, the Coriolis Principle, the Doppler Effect, and many others are all utilized as means to detect and/or measure flow. The types and methods of flow detection indicated in the descriptions and drawings should not be construed to limit the scope of flow detection mechanisms or methods that could be applied. Likewise, a method or apparatus which utilizes a particular mechanism to detect flow should be understood to be within the scope of the claims even if it is described to detect one of these phenomena. For example, a "pressure differential-controlled selecting means" is in fact a "flow-controlled selecting means" if the pressure differential detected is the cause of or the result of flow.

INDUSTRIAL APPLICABILITY

The present invention may be utilized in a garden hose or washing machine hose application, to solve or mitigate the problems caused by the presence of high pressure water in those hoses when high pressure is not needed. The invention also has application in other fluid delivery systems, examples of which may include a fire sprinkler system, a compressed gas delivery system, or a pneumatic control system.

I claim:

1. A method of controlling a pressure in a fluid delivery system, comprising the steps of: (a) using a variable-pressure regulating means (VPRM) with a flow-controlled selecting means (FCSM) to deliver the fluid, (b) regulating said pressure by adjusting two input selectable pressure set-points at a valve and at a pressure regulator valve simultaneously, wherein selecting at which of said set-points said pressure is regulated is based upon the flow rate of fluid in said fluid delivery system, such that said pressure is selected to be lower when said flow rate is lower, and said pressure is selected to be higher when said flow rate is higher, wherein said selecting at which of said set-points said pressure is regulated is accomplished automatically, and (c) allowing sufficient fluid to escape from within said fluid delivery system when said pressure is selected to be lower, such that said pressure can transition from a higher to a lower pressure; wherein said flow rate is an inherent signal that indicates the containment of fluid within, or the release of fluid from, said fluid delivery system, and wherein said lower pressure is greater than ambient pressure.

2. The method of claim 1 wherein said fluid delivery system includes an upstream pressurized fluid supply and a downstream portion that can be pressurized by communication with said upstream fluid supply, and wherein the regulated pressure is the pressure in said downstream portion.

3. The method of claim 1 wherein said method is for controlling the water pressure in a garden hose, a washing machine hose, or the piping and other components of a fire extinguishing system, a compressed gas system, or a pneumatic control system.

4. An apparatus that can receive pressurized fluid from an upstream supply, and that can control the pressure of fluid in a downstream fluid delivery system, comprising:
   (a) a valve means that can allow the pressure from said upstream supply to be delivered downstream, thereby providing a higher downstream pressure when said valve means is open;
   (b) a pressure-regulating means that can allow supply fluid to be delivered downstream at a lower pressure, thereby providing a lower downstream pressure;
   (c) a flow-controlled selecting means that is controlled by the flow rate of fluid within said apparatus, and that can automatically select whether said valve means is open or closed, such that said valve means is selected to be open when said flow rate is higher, and said valve means is selected to be closed when said flow rate is lower; and,
   (d) a bleed means that can allow fluid to escape from within said apparatus when said valve means is selected to be closed, allowing sufficient fluid to escape that the downstream pressure can transition from said higher downstream pressure to said lower downstream pressure;
   wherein said flow rate is an inherent signal that indicates the containment of fluid within, or the release of fluid from, said downstream fluid delivery system, and wherein said lower downstream pressure is greater than ambient pressure.

5. The apparatus of claim 4 wherein said apparatus receives an upstream pressurized fluid supply and includes a downstream portion that can be pressurized by communication with said upstream fluid supply, and wherein the regulated pressure is the pressure in said downstream portion.

6. The apparatus of claim 4 wherein said apparatus is for controlling the water pressure in a garden hose, a washing machine hose, or the piping and other components of a fire extinguishing system, a compressed gas system, or a pneumatic control system.

7. The apparatus of claim 4 wherein said apparatus further includes an accumulator means that contains the fluid passing through said bleed means when said pressure regulating means is selected to operate at a lower pressure, and then delivers said fluid back into said fluid delivery system when said pressure regulating means is selected to operate at a higher pressure.

8. The apparatus of claim 4 wherein said bleed means allows the bleed fluid to escape at the same location as delivered fluid normally escapes from said fluid delivery system.

9. The apparatus of claim 4 wherein said flow rate is determined by a flow detection means that operates on the principal selected from the group consisting of pressure differential, heat absorption of a flowing fluid, disturbance created in the fluid by flow, the Venturi Effect, the Coriolus Principle, and the Doppler Effect.

10. The apparatus of claim 4 wherein said apparatus is for a water system, and wherein said higher pressure is about the same pressure as house pressure.

11. The apparatus of claim 4 wherein said lower pressure is about one-fourth of said higher pressure.

12. The apparatus of claim 4 wherein said apparatus is for a garden hose, and wherein said bleed means is located on or within a nozzle or other valve means attached to the downstream end of said garden hose.

13. An apparatus for controlling the pressure in a fluid delivery system, comprising:
   (a) a pressure regulating means that is capable of regulating said pressure at a plurality of selectable pressures, said pressure regulating means comprising:
   a pilot-operated valve in fluid communication with an upstream fluid supply and also in fluid communication with a main passage such that pressurized fluid from said upstream fluid supply can flow into said main passage when said pilot-operated valve is open;
   wherein said pilot-operated valve is also in fluid communication with a pilot passage, such that when said pilot passage is blocked, said pilot-operated valve is closed, and when said pilot passage is not blocked, said pilot-operated valve is open;
   wherein said pilot passage is in fluid communication with a first pilot valve and a second pilot valve;
   wherein said first pilot valve is actuated by an actuator;
   wherein said main passage is in fluid communication with said actuator, such that said actuator is controlled by the fluid pressure in said main passage, such that said actuator can open or close said first pilot valve depending on said fluid pressure;
   wherein said actuator will close said first pilot valve when said fluid pressure in said main passage is a lower pressure than said pressurized fluid from said upstream fluid supply, thus providing a selectable lower pressure;
   wherein said selectable lower pressure is greater than ambient pressure;
   wherein said second pilot valve can block or unblock said pilot passage such that when said second pilot valve is open, said pilot-operated valve is open and allows said pressurized fluid from said upstream fluid supply to enter said main passage, thus providing a selectable higher pressure;
   such that when said second pilot valve is closed, said pressurized fluid from said upstream fluid supply can enter said main passage only to the extent that said fluid pressure in said main passage does not exceed said lower pressure as allowed by said actuator; and,
   (b) a selecting means that is capable of selecting at which of said selectable higher or lower pressures said pressure regulating means operates, wherein said selecting means is controlled by the flow rate of fluid within said fluid delivery system, such that said pressure-regulating means is selected to operate at a lower pressure when said flow rate is lower, and said pressure regulating means is selected to operate at a higher pressure when said flow rate is higher, said selecting means comprising:
   a fluid flow detecting means that operates on a flow detection principle selected from the group consisting of pressure differential, heat absorption, flow disturbance, Venturi Effect, Coriolus Principle, and the Doppler Effect, said fluid flow detecting means being in operating communication with said second pilot valve.

14. The apparatus of claim 13 wherein said apparatus further includes a bleed means that allows the escape of fluid from within said fluid delivery system when said pressure regulating means is selected to operate at said lower pressure.

* * * * *